United States Patent [19]
Robinson

[11] Patent Number: 5,713,192
[45] Date of Patent: Feb. 3, 1998

[54] TOW BAR ASSEMBLY FOR MULTIPLE HAY BALERS

[76] Inventor: Larry P. Robinson, 8001 E. Farmers Ave., Amarillo, Tex. 79118

[21] Appl. No.: 691,800

[22] Filed: Aug. 2, 1996

[51] Int. Cl.$^6$ .................................................. A01D 46/08
[52] U.S. Cl. .......................... 56/13.5; 56/15.1; 56/15.5; 56/16.4 R; 56/341; 56/DIG. 9; 56/DIG. 11; 56/DIG. 14
[58] Field of Search ................................. 56/14.7, 15.1, 56/15.2, 15.5, 16.4 R, 343, 341, DIG. 9, DIG. 11, DIG. 14, 13.5

[56] References Cited

U.S. PATENT DOCUMENTS

| | | |
|---|---|---|
| 3,343,849 | 9/1967 | Priddy . |
| 3,437,152 | 4/1969 | Barrentine . |
| 3,760,575 | 9/1973 | Moore ............................ 56/13.5 X |
| 4,304,086 | 12/1981 | Stuchl ............................ 56/13.5 X |
| 5,099,635 | 3/1992 | Butkovich et al. ................. 56/13.5 |

*Primary Examiner*—Terry Lee Melius
*Assistant Examiner*—Christopher J. Novosad
*Attorney, Agent, or Firm*—Dowell & Dowell

[57] ABSTRACT

A tow bar implement for a tractor wherein two or three balers may be simultaneously pulled through a field utilizing a conventional hitch of a tractor. The implement includes a pair of outrigger beams which are pivotally connected at opposite ends of a primary support beam and which support motors for driving the input drive shafts of a pair of outer balers. A third baler may be hitched directly to the primary beam intermediate the outer balers.

19 Claims, 4 Drawing Sheets

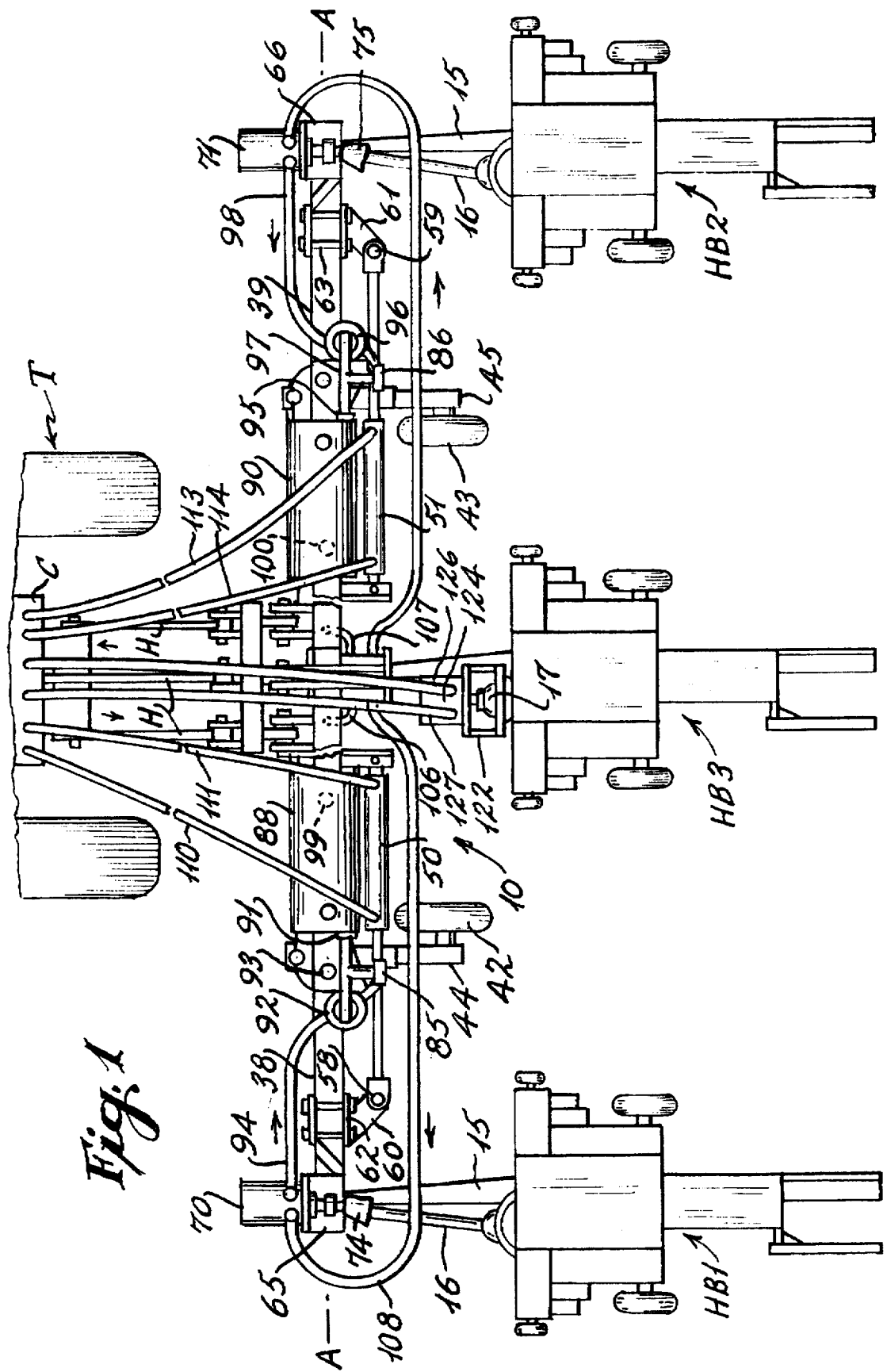

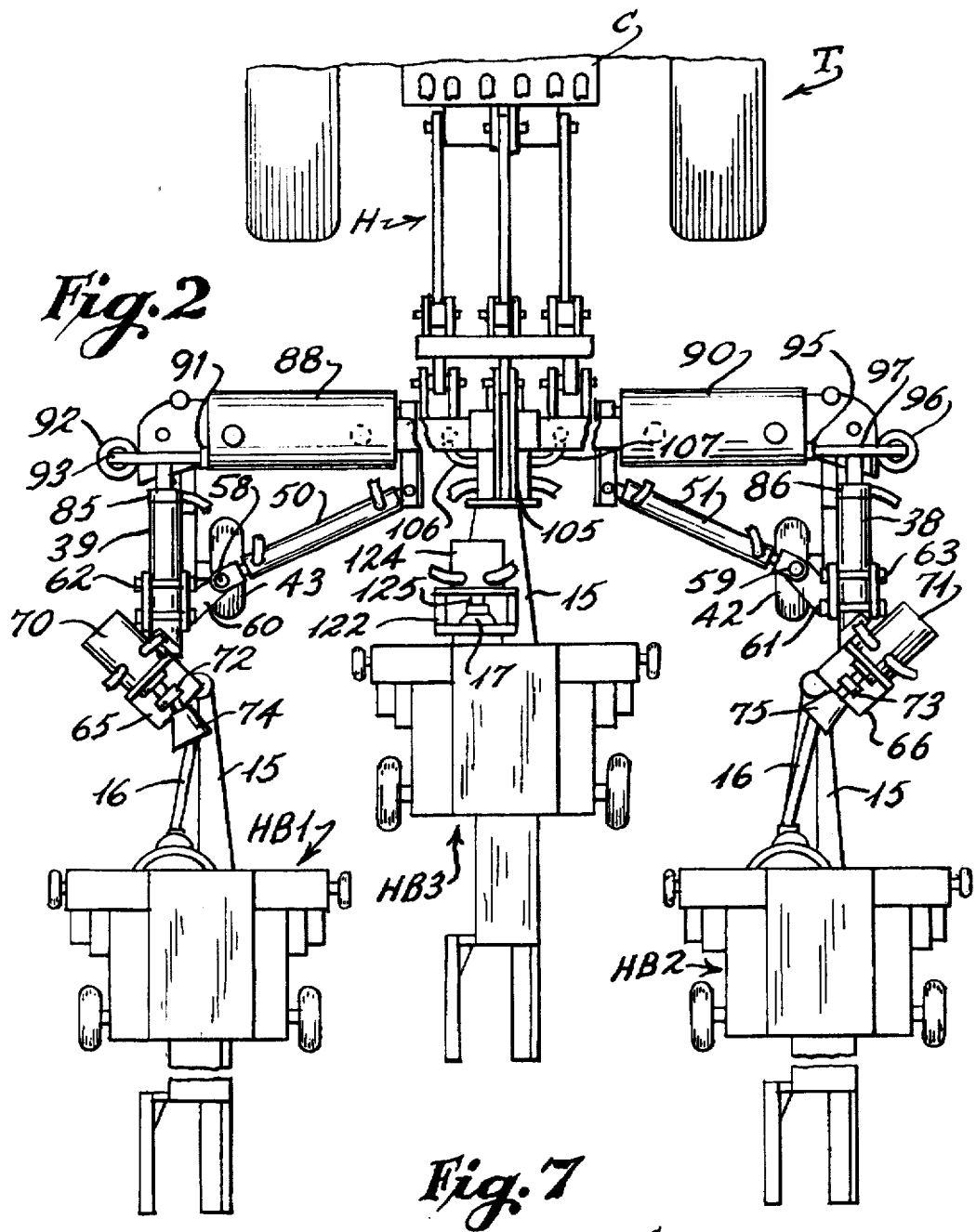
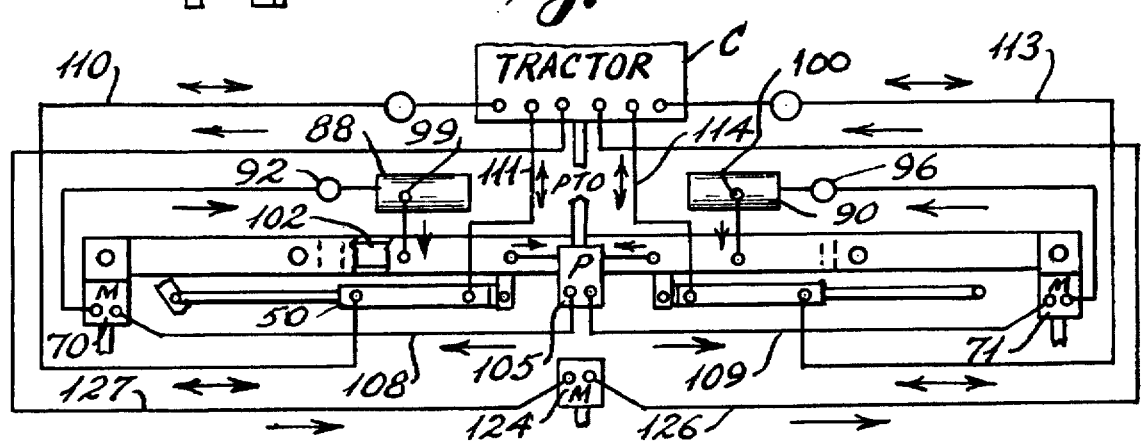

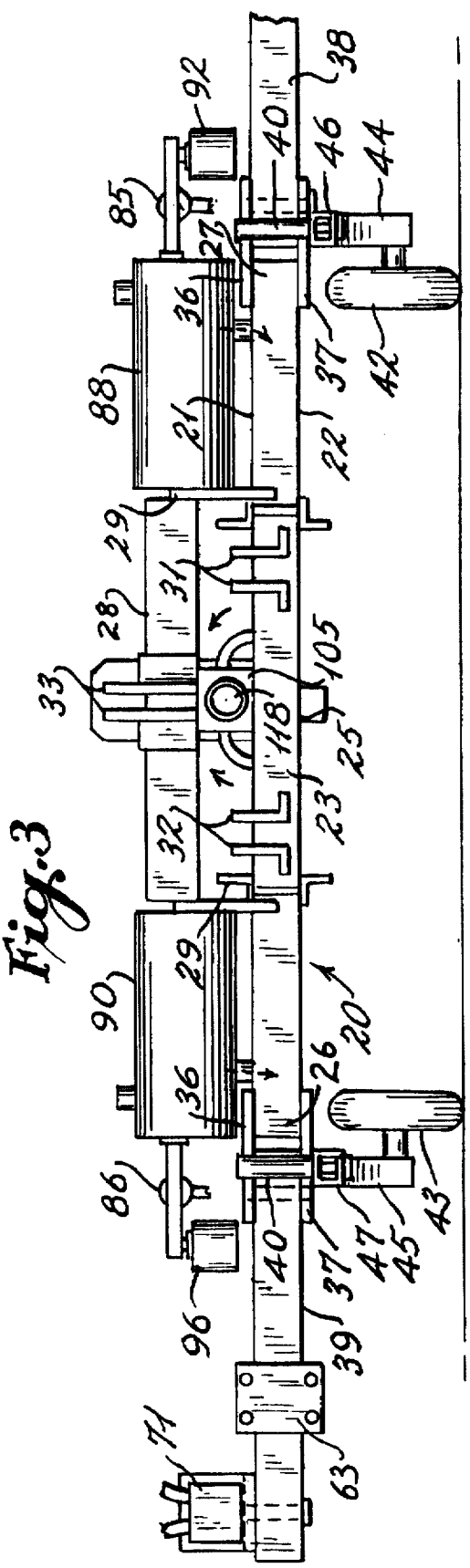
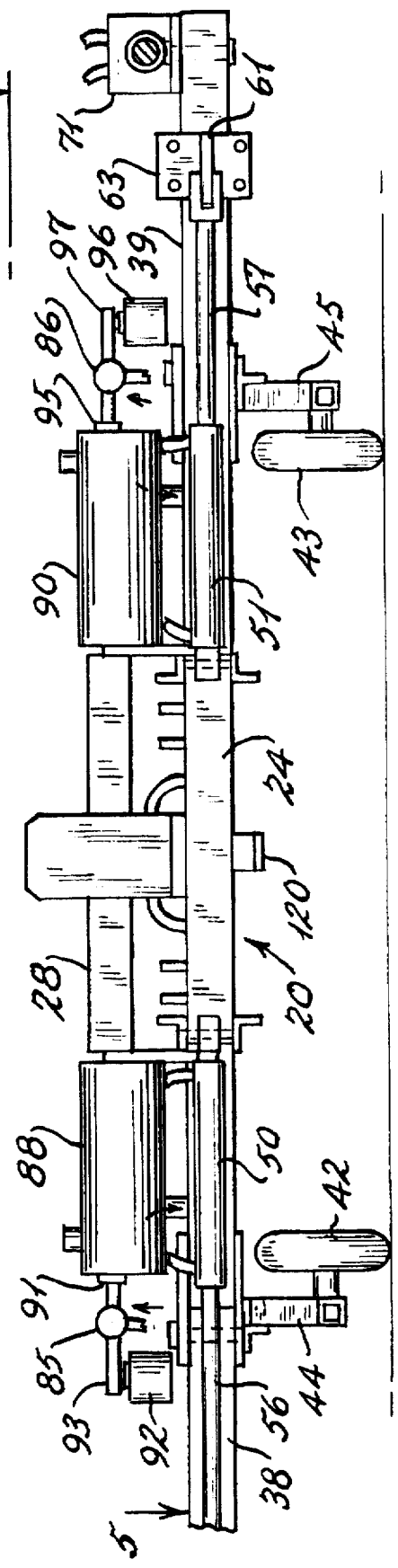

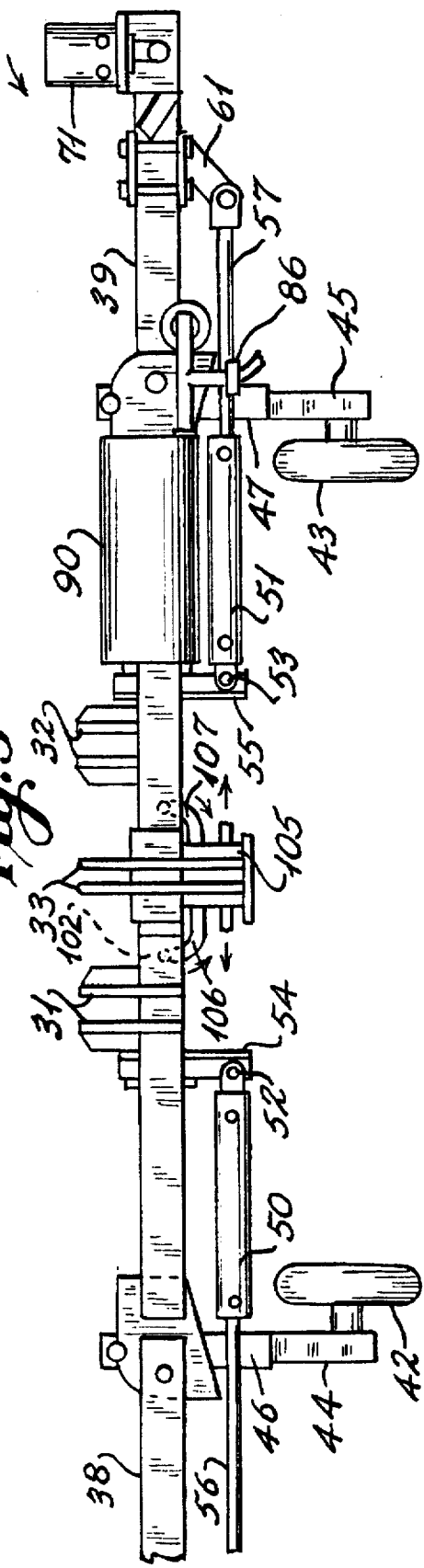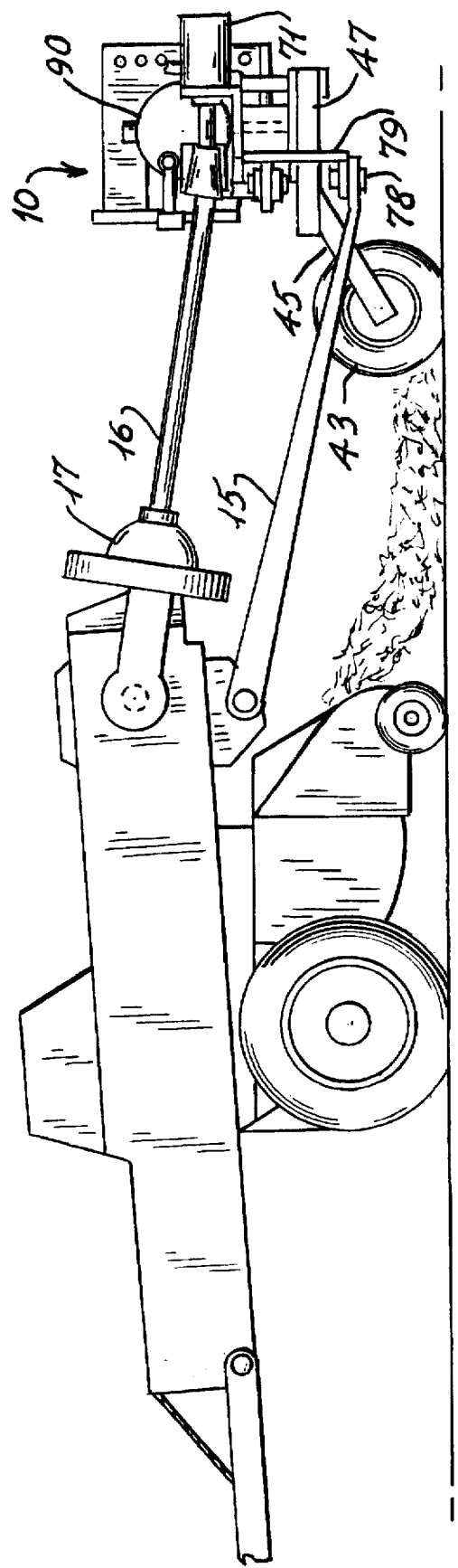

though the invention is described with reference to hay balers, it is also applicable to balers for baling other forage crops.

TOW BAR ASSEMBLY FOR MULTIPLE HAY BALERS

BACKGROUND OF THE INVENTION

1. Field of the Invention

This invention is generally directed to agricultural implement tow bars and, more particularly, a tow bar having adjustable outrigger beams which allow for two or more hay or other forage balers to be conveyed behind a single tractor and wherein the lateral spacing between the hay baler may be changed during movement of the balers through a field to adjust for spacing in windrows or to facilitate over the road transport and vehicle turning.

2. History of the Related Art

After hay and other vegetable matter has been cut and/or processed in the field, it is normally raked into windrows for purposes of facilitating baling of the material into either round or rectangular bales. Conventionally, a single hay baler is pulled through a field by a tractor or similar vehicle with the hay baler passing over a single windrow at a time. This requires repeated passes of the tractor through the field, thereby consuming not only fuel but also requiring multiple hours of vehicle operation and operator worktime.

In some agricultural environments, it has been proposed to utilize multiple implements pulled by a single tow bar to increase the rate of harvesting. By way of example, in U.S. Pat. No. 5,099,635 to Butkovich et al., a system for harvesting cotton is disclosed in which a tow bar assembly is provided for simultaneously carrying a plurality of cotton harvesting units. In U.S. Pat. No. 3,437,152 to Barrentine, an agricultural implement for pulling stalks, such as corn stalks from which corn has been harvested, is disclosed for pulling and grinding the stalks of multiple rows of the stalks simultaneously.

Another example of agricultural implement incorporating multiple cutting units is disclosed in U.S. Pat. No. 4,304,086 to Stuchl wherein a lawnmowing attachment has a plurality of lawnmowing decks which are mounted in laterally spaced relationship with respect to one another in order to maximize the cutting width as the implement passes over an area being mowed.

There is an ever-increasing need to reduce costs associated with the baling of hay and other forage products. By enabling a plurality of baling machines to be operated simultaneously, not only is it possible to reduce man hours associated with the baling but the operating hours of the harvesting machinery would be considerably reduced, especially with respect to the powering units, such as tractors, which will effectively extend the overall life of such vehicles.

It should be noted at this point in this application that the term "hay baler" is utilized. It should be noted that "balers" are also conventionally used for baling other forage materials such as peanut vines and the like which are acceptable as fodder. The term "hay baler" is meant to be generic to all types of balers having the features which are described herein with respect to the Description of the Preferred Embodiment and are not limited to hay balers per se.

SUMMARY OF THE INVENTION

The present invention is directed to a tow bar implement for use with tractors or other vehicles for enabling a plurality of baling units, such as hay balers, to be conveyed simultaneously through a field. The implement includes a primary support beam having outer portions to which outrigger beams are pivotally mounted. Actuation devices are utilized between the primary support beam and the outrigger beams to enable the outrigger beams to be moved from a position wherein they are in substantial alignment with the elongated axis of the primary support beam to an orientation substantially perpendicularly with respect thereto. The outrigger beams support drive motors which are connected by universal drive joints to the input drive shafts of hay balers which are secured in towing relationship to the outrigger beams.

In the preferred embodiment, the motors are hydraulically driven utilizing hydraulics which may include fluid reservoirs mounted to the primary support beam and which are connected to a pump for distributing hydraulic fluid to each of the motors. In the preferred embodiment, the primary support beam also functions as a hydraulic fluid reservoir and heat exchange chamber for cooling the hydraulic fluid during operation of the balers being towed by the implement.

The actuation devices secured to the outrigger beams are directly connected to the hydraulic system of the vehicle so as to be controllable from the cab of the vehicle whereby the operator may change the angular displacement of the outrigger beams relative to the primary support beam as the implement is moved through a field to thereby allow selective positioning of the balers to adjust for spacing in windrows without requiring that the vehicle be stopped.

For allowing a third baler to be utilized with the present invention, a separate hitch is provided along the control portion of the primary support beam to which the tongue of an intermediate hay baler is pivotally secured. The drive input to the intermediate hay baler is provided by mounting a third hydraulic motor to a frame mounted to the implement support beam or mounted in surrounding relationship to the input to the drive system on the baler. The hydraulic motor is directly connected to the hydraulic system of the tractor or, in the alternative, connected to the hydraulic system and pump associated with the motors associated with the outrigger beams.

It is the primary object of the present invention to provide a tow bar implement which permits two or three baling machines to be pulled through a field simultaneously in such a manner that the outer two machines may be pre-positioned laterally inwardly and outwardly relative to one another as the balers are conveyed through a field.

It is yet another object of the present invention to provide a tow bar implement for allowing a plurality of balers to be conveyed by a single tractor wherein the spacing between the balers may be regulated so that they are brought into close proximity to one another for conveying over roadway surfaces and thereafter extended outwardly with respect to one another to facilitate their use in baling forage material which has been raked into windrows.

It is a further object of the present invention to provide a tow bar implement for use in simultaneously operating two or three hay baling units wherein the tow bar has incorporated therewith outriggers to which drive motors are secured for supplying power to the input drive shafts of the hay balers and wherein a pump carried by the tow bar implement is designed to be powered by the power takeoff of the vehicle to supply fluid from a circuit also carried by the tow bar implement to the drive motors.

BRIEF DESCRIPTION OF THE DRAWINGS

The present invention will be better understood with reference to the attached drawings, wherein:

3

FIG. 1 is a top plan view of the implement tow bar for multiple hay balers of the present invention illustrating the manner in which the tow bar is utilized to connect a plurality of hay balers to the hitch and hydraulic controls of a conventional tractor and having the balers spaced at a maximum distance from one another;

FIG. 2 is a top plan view of the implement of FIG. 1 having portions broken away showing the outrigger portions of the tow bar implement realigned generally perpendicularly with respect to the main support beam of the implement of the present invention and further illustrating the repositioning of the plurality of hay balers mounted to the tow bar;

FIG. 3 is a partial front elevational view of the tow bar implement of FIG. 1;

FIG. 4 is a partial rear elevational view of the tow bar implement of FIG. 1;

FIG. 5 is a view taken along line 5—5 of FIG. 4;

FIG. 6 is a side elevational view showing the attachment of a hay baler to the tow bar implement of the present invention; and FIG. 7 is a fluid circuit diagram illustrating the hydraulic circuits of the present invention.

DESCRIPTION OF THE PREFERRED EMBODIMENT

With continued reference to the drawing figures, the tow bar implement 10 of the present invention is illustrated in FIG. 1 as being secured to the three point hitch "H" associated with a conventional tractor "T". As shown in FIG. 1, power for manipulating the tow bar implement as well as for driving motors associated therewith is obtained by connecting hydraulic lines to the hydraulic control circuit "C" associated with the tractor. The complete fluid circuit will be described in greater detail hereinafter. The present invention is designed to be utilized to simultaneously operate a plurality of hay balers as the tractor moves through a field. In the drawing figures, three hay balers HB1, HB2 and HB3 are illustrated. In some instances, it may be desired to use only two hay balers HB1 and HB2 in combination with the tow bar implement. The drawing figures generally illustrate square balers of a type such as identified as Case International Model 8545. With specific reference to FIG. 6, such balers include a hitch tongue 15 and an input power or drive shaft 16 which is connected by a universal 17 to the drive mechanism (not shown) of the baler.

The tow bar implement 10 includes a primary support beam 20 having upper and lower walls 21 and 22 and front and rear walls 23 and 24, respectively. The primary beam 20 is preferably formed of a generally hollow steel material of rectangular cross-section and includes a generally central portion 25 and opposite end portions 26 and 27. The central portion 25 of the primary support beam 20 is further reinforced by an auxiliary beam 28 which is mounted in generally parallel spaced relationship thereto and which is connected to the central portion by means of a pair of spaced outer plates 29 which are welded to both the auxiliary and the primary support beams.

Extending from the front wall 23 of the primary support beam are a pair of spaced mounting brackets 31 and 32 which are designed to be engaged with the lower hitch links of the three point hitch "H" of the tractor. The upper hitch link of the tractor is connected to a pair of spaced brackets 33 mounted to the auxiliary support beam 28. Utilizing the three point hitch of the tractor, the tow bar implement may be raised for transport.

4

At each of the ends 26 and 27 of the primary support beam 20 are a pair of outwardly extending upper and lower plates 36 and 37 which are welded to the upper and lower walls of the support beam, respectively. Outrigger beams 38 and 39, which are also formed of a generally rectangular cross-sectional tubular steel material, are pivotally mounted by pivot pins 40 between the upper and lower plates 36 and 37 so that the outrigger beams 38 and 39 may be pivoted relative to the primary support beam 20. The outrigger beams 38 and 39 may be pivoted from a generally aligned relationship with the elongated axis "A—A" of the primary beam, as shown in FIG. 1, to any selected angular relationship generally rearwardly with respect to the primary support beam. In FIG. 2, the outrigger beams 38 and 39 are shown as being oriented generally perpendicularly with respect to the primary support beam.

The implement includes a pair of wheels 42 and 43 which are mounted to vertical struts 44 and 45 connected to brackets 46 and 47 secured to the upper and lower plates 36 and 37 adjacent the opposite ends 26 and 27 of the primary support beam. As shown in FIGS. 5 and 6, the struts 44 and 45 are generally inclined rearwardly and downwardly relative to the primary support beam.

The angular positioning of each of the outrigger beams 38 and 39 is controlled by various actuation means which may be incorporated with the tow bar. In the preferred embodiment, the actuation means are hydraulic cylinders 50 and 51 which are pivotally mounted at 52 and 53 to brackets 54 and 55 which are welded or otherwise secured to the primary support beam adjacent the central portion thereof, as shown in FIG. 5, and which extend rearwardly of the rear wall 24 of the primary beam so that the cylinders 50 and 51 may be oriented in a generally parallel relationship with respect to the primary beam when the outrigger beams 38 and 39 are generally aligned along the elongated axis "A—A" of the primary beam. Each hydraulic cylinder 50 and 51 includes an extension rod 56 and 57 which is pivotally mounted at 58 and 59, respectively, to brackets 60 and 61 which are connected such as by adjustable clamping assemblies 62 and 63 which are adjustable along the length of the outrigger beams 38 and 39. When the hydraulic cylinders are activated so as to retract the extension rods 56 and 57 to a fully closed position, as shown in FIG. 2, the outrigger beams 38 and 39 are moved to a position wherein they are oriented generally perpendicularly rearwardly of the primary support beam. This allows for the selected spacing of hay balers which are utilized in combination with the tow bar implement.

Brackets 65 and 66 are mounted to the upper portion of the outrigger beams 38 and 39 adjacent the outer end portions thereof, respectively, on which are mounted hydraulic motors 70 and 71. The motors include drive shafts 72 and 73, respectively, which are connected to universal couplers 74 and 75 which engage the outer end portions of the input drive shafts 16 of a pair of outer hay balers HB1 and HB2. The hitch tongue 15 of each of the hay balers HB1 and HB2 are connected, as shown in FIG. 6, such as by pins 78 to hitch brackets 79 which are welded or otherwise secured adjacent the outer end portions of each of the outrigger beams 38 and 39. In this manner, the hay balers are pivotally connected to the hitch brackets 79 to the tow bar implement and are also connected to receive power to the input drive shafts 16 from the hydraulic motors 70 and 71. Due to the universal couplers 74 and 75 as well as the universal joint 17 associated with each hay baler, it is possible to drive the input shafts 16 regardless of the orientation of the hydraulic motors 70 and 71 relative to the hay balers HB1 and HB2. It should be noted that the angular orientation is varied depending upon the angular relationship of the outrigger beams 38 and 39 relative to the primary support beam 20.

In order to supply fluid power to the hydraulic motors 70 and 71, the tow bar implement 10 of the present invention is designed to provide a source of hydraulic fluid. In this respect, mounted adjacent each of the opposite ends of the primary support beam are a pair of hydraulic fluid tanks 88 and 90 which are designed to hold approximately nine gallons of hydraulic fluid each. Tank 88 has a fluid inlet opening 91 from which hydraulic fluid is received from a filter 92 by way of a flowline 93. The filter 92 is connected by a hydraulic line 94 extending from the outlet of the hydraulic motor 70. Hydraulic tank 90 includes a fluid inlet 95 which is connected to a filter 96 by way of fluid inline 97. The filter 96 is connected to a hydraulic outlet line 98 extending from the hydraulic motor 71. Both of the tanks 88 and 90 have discharge outlets 99 and 100, respectively, which communicate the tanks with an interior chamber 102 defined within the primary support beam 20, as shown in the fluid circuit diagram of FIG. 7. Approximately 13 gallons of hydraulic fluid is retained within the chamber 102 which acts as a heat exchange reservoir for cooling the hydraulic fluid during the use of the implement. Often, the implement will be utilized in areas of intense solar radiation where high ambient temperatures are experienced. The lower portions of the primary beam are not directly exposed to radiation energy and therefore are cooler than the surrounding metallic components. This allows a heat exchange to take place, cooling the hydraulic fluid passing through the primary support beam.

In order to supply hydraulic fluid to the hydraulic motors 70 and 71, a hydraulic pump 105 is mounted to the central portion of the primary support beam. The pump 105 receives hydraulic fluid through hydraulic lines 106 and 107 from the chamber 102 within the primary support beam 20 and discharges the fluid through motor supply hydraulic lines 108 and 109 to the motors 70 and 71. It is desired that the pump is capable of driving the motors at a minimum of 540 rpm in order to supply sufficient power for operating the input shafts 16 of the balers HB1 and HB2. In order to control the hydraulic motors 70 and 71, valves 85 and 86 are placed within the fluid circuit adjacent to the filters 92 and 96 for regulating the rate of fluid flow through the circuit.

Hydraulic fluid for operating the hydraulic cylinders 50 and 51 is provided directly from the hydraulic control circuits "C" associated with the tractor. In this respect, hydraulic cylinder 50 is connected by hydraulic lines 110 and 111 to the control circuit "C" and hydraulic cylinder 51 is connected to hydraulic lines 113 and 114. Since these lines are directly connected to the tractor's control circuit, the tractor operator may control the extension and retraction of the rods associated with the cylinders 50 and 51 from the cab of the tractor. Power for the hydraulic pump 105 is derived directly from the power takeoff from the tractor utilizing a drive connection 118.

Although only two hay balers have been disclosed as being connected to the outrigger beams 38 and 39 of the present invention, the implement of the present invention is also designed to tow and provide operating power to an intermediate or third hay baler HB3, as shown in FIGS. 1 and 2. The trailer tongue 15 of the intermediate hay baler HB3 is designed to be pivotally connected by a pin to a hitch bracket 120 which is welded or otherwise secured generally centrally of the central portion 25 of the primary support beam 20. Power to drive the drive shaft 16 of the intermediate or third baler is provided by a hydraulic motor 124 which may be mounted to the primary beam or to the baler. As shown in the drawings, a support bracket 122 is mounted in surrounding relationship to the universal joint 17 of the hay baler HB3 for purposes of supporting the hydraulic drive motor 124 which has an output shaft connected to the coupling 17. The hydraulic motor 124 is connected to the vehicle hydraulic circuit "C" by way of inlet and outlet hydraulic lines 126 and 127, respectively.

In the use of the implement of the present invention, either two or three hay balers may be attached, as previously described, to the implement. Generally, after the hay or other forage material has been cut and harvested, it is raked into windrows which may vary in spacing, depending upon field conditions and other parameters. The present unit is designed to allow up to three windrows to be baled simultaneously. The general overall width of the unit when the outrigger beams are expanded, such as shown in FIG. 1, is approximately 16 feet. By the operator manipulating the hydraulic cylinders 50 and 51 to retract the piston rods 56 and 57, the spacing between the outer hay balers and the central hay baler may be adjusted. As the controls are available to the operator in the cab of the tractor, it is possible to change the relative spacing of the balers as the tractor is moving through the field to account for changes in windrow positioning. When the piston rods of the hydraulic cylinders are fully retracted so that the hay balers are positioned as shown in FIG. 2, the overall width of the implement is reduced to approximately 10 to 12 feet, thereby allowing travel on roadways to and from fields. Further, for purposes of turning at the ends of fields, the operator may selectively activate either cylinder 50 or 51 to change the relative positioning of one of the balers to facilitate the ease of movement of the tractor at the ends of the windrows.

To further facilitate the movement of the implement when utilized with a plurality of hay balers, it is possible that additional pivotable wheels 130 may be attached to each of the outrigger beams 38 and 39 such as exemplified in dotted line in FIG. 3. In most instances, this is not necessary, however, if the overall outer dimensions and lengths of the outrigger beams are changed, it is possible that additional support may be necessary.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A tow bar implement for use in operatively connecting a plurality of balers having drive inputs and hitch tongues to the hitch of a tractor having a source of power supply, the tow bar implement comprising, a primary support beam having opposite ends and a central portion, said primary support beam having a forward portion and a rear portion, bracket means mounted to said central portion of said primary support beam for mounting said primary support beam to the tractor hitch, a pair of outrigger beams, pivot means for pivotally mounting an inner end portion of each said outrigger beams to said opposite ends of said primary support beam, an activation means for pivoting each of said outrigger beams about said pivot means, each of said activation means including a first end pivotally mounted to said primary support beam and a second end pivotally mounted to said outrigger beams, a motor means pivotally mounted to each of said outrigger beams, each of said motor means having an output shaft adapted to be drivingly connected to the drive input of a baler, means for connecting an outer end portion of each of said outrigger beams to the hitch tongue of a baler, and means for supplying power to each of said motor means.

2. The tow bar implement of claim 1 including a hitch means mounted to said central portion of said primary support beam and extending from said rear portion thereof, said hitch means being adapted to be connected to the hitch tongue of a baler, whereby a baler connected thereto is positioned intermediate balers connected to said outer end portions of each of said outrigger beams.

3. The tow bar implement of claim 2 including wheel support means mounted to said primary support beam.

4. The tow bar implement of claim 3 including a support wheel pivotally mounted to each of said outrigger beams.

5. The tow bar implement of claim 2 including an intermediate motor means having an output shaft adapted to be connected to a drive input of an intermediate baler, and means for connecting said intermediate motor means to a source of power supply.

6. The tow bar implement of claim 5 wherein each of said activation means includes a hydraulic cylinder pivotally mounted to said primary support beam and having a piston rod extending outwardly and pivotally connected to one of said outrigger beams, and means for supplying hydraulic fluid to each of said hydraulic cylinders.

7. The tow bar implement of claim 6 wherein said means for supplying hydraulic fluid includes hydraulic lines adapted to be connected to the source of power supply of the tractor.

8. The tow bar implement of claim 7 in which said motor means are hydraulic motors, at least one hydraulic fluid tank means mounted to said primary support beam, said means for supplying power to each of said motor means including pump means for circulating fluid within said at least one fluid tank to said hydraulic motors.

9. The tow bar implement of claim 8 in which said primary support beam includes an inner chamber in which hydraulic fluid is circulated to said pump means.

10. The tow bar implement of claim 9 in which said means for connecting said intermediate motor means includes hydraulic lines adapted to be connected to the source of power supply of the tractor.

11. The tow bar implement of claim 1 wherein each of said activation means includes a hydraulic cylinder pivotally mounted to said primary support beam and having a piston rod extending outwardly and pivotally connected to one of said outrigger beams, and means for supplying hydraulic fluid to each of said hydraulic cylinders.

12. The tow bar implement of claim 11 in which said motor means are hydraulic motors, at least one hydraulic fluid tank mounted to said primary support beam, said means for supplying power to each of said motor means including pump means for circulating fluid within said at least one fluid tank to said hydraulic motors.

13. The tow bar implement of claim 12 in which said primary support beam includes an inner chamber in which hydraulic fluid is circulated to said pump means.

14. A baling implement for simultaneously baling forage material in a plurality of rows, and which is attachable to a tractor having a power source, the baling implement comprising, a plurality of balers, each having a drive input and a hitch tongue, a primary support beam having opposite ends and a central portion, said primary support beam having a forward portion and a rear portion, bracket means mounted to said central portion of said primary support beam for mounting said primary support beam to the tractor hitch, a pair of outrigger beams, pivot means for pivotally mounting an inner end portion of each said outrigger beams to said opposite ends of said primary support beam, an activation means for pivoting each of said outrigger beams about said pivot means, each of said activation means including a first end pivotally mounted to said primary support beam and a second end pivotally mounted to said outrigger beams, a motor means pivotally mounted to each of said outrigger beams, each of said motor means having an output shaft adapted to be drivingly connected to the drive input of a baler, means for connecting an outer end portion of each of said outrigger beams to the hitch tongue of one of said plurality of balers, and means for supplying power to each of said motor means.

15. The tow bar implement of claim 14 wherein each of said activation means includes a hydraulic cylinder pivotally mounted to said primary support beam and having a piston rod extending outwardly and pivotally connected to one of said outrigger beams, and means for supplying hydraulic fluid to each of said hydraulic cylinders.

16. The baling implement of claim 15 including three balers, a hitch means mounted to said central portion of said primary support beam and extending from said rear portion thereof, said hitch means being connected to the hitch tongue of one of said three balers, whereby a baler connected thereto is positioned intermediate balers connected to said outer end portions of each of said outrigger beams.

17. The tow bar implement of claim 16 including an intermediate motor means having an output shaft adapted to be connected to a drive input of an intermediate baler, and means for connecting said intermediate motor means to a source of power supply.

18. The tow bar implement of claim 17 in which said motor means are hydraulic motors, at least one hydraulic fluid tank mounted to said primary support beam, said means for supplying power to each of said motor means including pump means for circulating fluid within said at least one fluid tank to said hydraulic motors.

19. The tow bar implement of claim 18 in which said primary support beam includes an inner chamber in which hydraulic fluid is circulated to said pump means.

* * * * *